(12) United States Patent
Jang

(10) Patent No.: US 6,614,884 B2
(45) Date of Patent: Sep. 2, 2003

(54) AUTOMATIC HOME ALARM SYSTEM AND METHOD

(76) Inventor: Jung Kee Jang, 1441-31 Sinlim-5 dong, Kwanak-ku, Seoul (KR)

( * ) Notice: Subject to any disclaimer, the term of this patent is extended or adjusted under 35 U.S.C. 154(b) by 180 days.

(21) Appl. No.: 09/932,623

(22) Filed: Aug. 17, 2001

(65) Prior Publication Data

US 2003/0035514 A1 Feb. 20, 2003

(51) Int. Cl.$^7$ ............................................. H04M 11/04
(52) U.S. Cl. ............................................ 379/41; 379/40
(58) Field of Search ....................... 379/37–51

(56) References Cited

U.S. PATENT DOCUMENTS

| 4,791,658 A | * | 12/1988 | Simon et al. | .................. 379/41 |
| 5,710,803 A | * | 1/1998 | Kowal et al. | .................. 379/41 |
| 5,729,197 A | * | 3/1998 | Cash | ............................ 379/41 |

* cited by examiner

Primary Examiner—Wing Chan

(57) ABSTRACT

The automatic home alarm system and method invention comprises one or more sensors, at least one sensor hub that identifies and transmits a state change signal upon the occurrence of an alarm trigger to a system unit, and said system unit communicates such information to an alarm call center or alarm authority using one or more telecom paths (e.g., dial-up telephone, mobile phone).

3 Claims, 3 Drawing Sheets

AUTOMATIC HOME ALARM SYSTEM AND METHOD

BACKGROUND OF THE INVENTION

1. Field of the Invention

This invention relates generally to home security alarm systems. More particularly, the present invention combines a sensor hub and sensors, microprocessor, and announcement database with wireline or wireless paths to an alarm call center or alarm authority.

2. Description of the Related Art

Home alarm systems typically comprise sensors, annunciators, and telecom paths. Sensors include those for fire, motion within a room, structural movement (e.g., doors and windows), sound (e.g., glass breaking), and panic buttons (e.g., medical or threat emergencies). Annunciators, which are activated when a sensor is triggered, include local audible alarms (e.g., sirens, bells, voice warnings) and messages sent using the telecom paths to an alarm call center (a central station where operators monitor alarms from alarm service subscribers) or directly to an alarm authority (e.g., police, fire department, ambulance).

Typically, a local sensor in a multi-sensor alarm system detects fire, motion within a room, structural movement, specific sounds, operation of a panic buttons, or other state for which a sensor is designed (each such detection is an "alarm trigger") and sends a signal to a local processor ("sensor hub"), usually on premises. The sensor hub then sends a signal over a wireline (e.g., dial-up or leased telephone line, DSL, cable modem) or wireless (e.g., mobile phone network, private radio service) to an alarm call center or alarm authority, where a response to the alarm is undertaken. Korean Patent Publication No. 1994-003078, entitled "Automatic Alarm System via Telephone Lines", and U.S. Pat. No. 5,877,683, granted to Sheasley, illustrate typical systems.

There are several problems with typical home alarm systems. Basic home alarm systems typically do not differentiate between types of alarms (e.g., fire, motion, medical). This lack of differentiation requires the alarm call center to interpret the alarms received. Errors can be made in this interpretation, and the wrong type of alarm response dispatched. Improved home alarm systems, such as that disclosed in U.S. Pat. No. 6,215,404, granted to Morales, include a means of analyzing the local annunciator sound output (e.g., siren, bell), in essence, performing an electronic interpretation of the type of alarm. Electronic interpretations, however, are not as good as actual identification of sensor type. There is an unmet need for a home alarm system that differentiates between types of sensor that produces an alarm trigger and communicates that information to the alarm call center or alarm authority using one or more telecom paths.

SUMMARY OF THE INVENTION

The present automatic home alarm system and method invention comprises one or more sensors, at least one sensor hub that identifies and transmits the type of sensor or alarm trigger to a system unit, which communicates such information to an alarm call center or alarm authority using one or more telecom paths (e.g., dial-up telephone, mobile phone) and one or more message types (e.g., voice, proprietary signalling). Sensors types used in the invention can include those for fire, motion within a room, structural movement (e.g., doors and windows), sound (e.g., glass breaking), and panic buttons (e.g., medical or threat emergencies). Annunciators used in the invention can include can include local audible alarms (e.g., sirens, bells, voice warnings), visible alarms (e.g., flashing lights, semaphores), and messages sent using the telecom paths to an alarm call center or to an alarm authority.

A microprocessor-based, system unit in the invention receives alarm triggers from one or more sensor hubs, and processes that information as follows: (a) on a dial-up or mobile phone circuit, it dials an alarm call center or an alarm authority and establishes a telecom path; (b) it selects and retrieves voice messages from an announcement database and plays the selected message over the telecom path; (c) it terminates the call to an alarm call center or alarm authority based on expiration of a time period; (d) it selects and retrieves voice messages from an announcement database and plays the selected message over an interphone path; and (e) it rings one or more telephone in the home where the system unit is installed. Use of wireless telecom paths to an alarm call center or to an alarm authority avoids the problem of wireline path interruptions due to cutting or corrosion.

DETAILED DESCRIPTION OF THE PREFERRED EMBODIMENT

Figure 1:
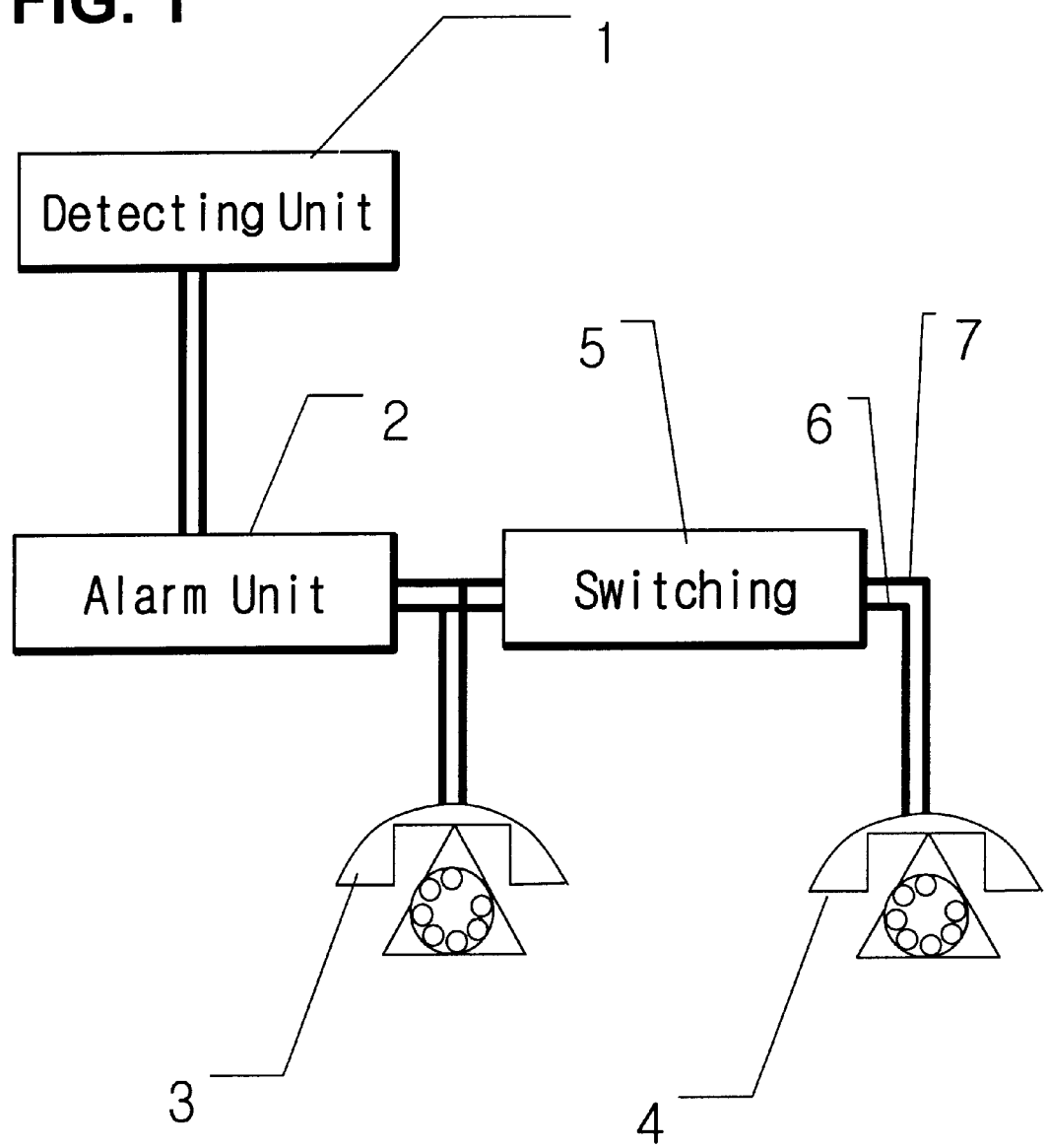
FIG. 1 is a block diagram showing a home alarm system of the related art.

As shown in FIG. 1, typical home alarms systems comprise a detecting unit (1) connected to a local alarm unit (2). Typical detecting units (1) include a reed switch (which operates in a magnetic field and provides a contact/no-contact switch), infrared sensors, and ultrasonic sensor. Trigger events for which the sensor is designed, e.g, movement of a reed-switch as a window is being opened cause the generation of a detection signal to the alarm unit (2). Due to a contact operation in an alarm unit (2) which receives the detection signal, the alarm unit (2) places one ore more interphone or telephone calls (using lines 6, 7) during which voice messages informing a called party are sent from the alarm unit (2) to the called parties (3, 4). The voice message informs a called party of the position and the emergency of the calling party or location where the alarm unit is located.

However, when a telecom path between the detecting unit (1) and the alarm unit (2) is restricted to a wires, there is a problem if the connection lines are cut, or corroded through passage of time, so that connectivity is impaired.

Accordingly, the present invention has been developed to solve the foregoing problems. It is an object of the present invention to provide an automatic home alarm system and method, by which an alarm trigger, e.g., an unauthorized intrusion detected with an ultrasonic motion sensor, is transmitted from a detecting unit using a wireline or wireless path, a pre-recorded voice stored in an announcement database is transmitted to a specific site, and a sound alarm or voice message is sent to and emitted by an interphone at a short range so that the condition that caused the alarm trigger can be handled appropriately.

To obtain the foregoing objects, the automatic home alarm system comprises: one or more detecting means, typically including several operated through contact/no-contact switches, each of which detecting means closes a circuit or otherwise generates a first "state change signal" after an alarm trigger; a means for receiving the first state change signal from each detecting means in a wire or radio mode; a first driving means under the control of a microprocessor and that generates a drive signal to a voice reproducing unit; a voice reproducing means that is driven by the driving means and outputs a pre-recorded voice message that is selected and retrieved from an announcement database; a means controlled by the microprocessor of dialing a telephone call or otherwise establishing connectivity through telephone lines to send notification of the intrusion or other condition causing an alarm trigger; a means for generating a tone signal for dialing a telephone call; a means for making a telephone call, typically a telephone circuit interface means, in the path between the tone signal generating unit and the voice reproducing unit on the one hand, and one or more telephone circuits on the other hand; a timer means; a means for detecting an off-hook condition of a called party's telephone; a memory means for storing telephone number data; a means for generating a ring signal; a second driving means for driving an interphone; and a control means, typically a microprocessor, for selecting and reading the appropriate telephone number data from a memory means in response to the signal from the signal receiving means, which control means also controls the tone signal generating means to generate the tone signal according to the read telephone number data and transmit the same to a telephone circuit using the telephone circuit interface means, and also controls the voice reproducing means, the ring signal generating means, and the interphone driving means in sequence according to the time counted by the timer means when an off-hook condition of the called party's telephone is detected by the call sound detecting means.

The preceding combination of means comprises the principal components of the automatic home alarm invention and enables the receipt of an alarm trigger from a detection means and the notification of a called party of the emergency associated with that alarm trigger. The automatic home alarm method comprises the following steps: generating a state change signal after an alarm trigger is detected by a detecting means; generating a tone signal corresponding to a stored telephone number upon receiving the detection signal, which results in a call being dialed using the telephone circuit interface means; determining if an off-hook condition of the called party's telephone is detected by the call sound detecting means after the step of dialing the call; if said off-hook condition is detected, commencing the counting of time by the timer means; and sequentially playing the outgoing message, generating ring signal to a local telephone or other local sound alarm, and driving an interphone, all based on increments of time according to the time counted by the timer means.

Hereinafter detailed description of the invention will be made about a preferred embodiment in reference to the accompanying drawings.

Figure 2:
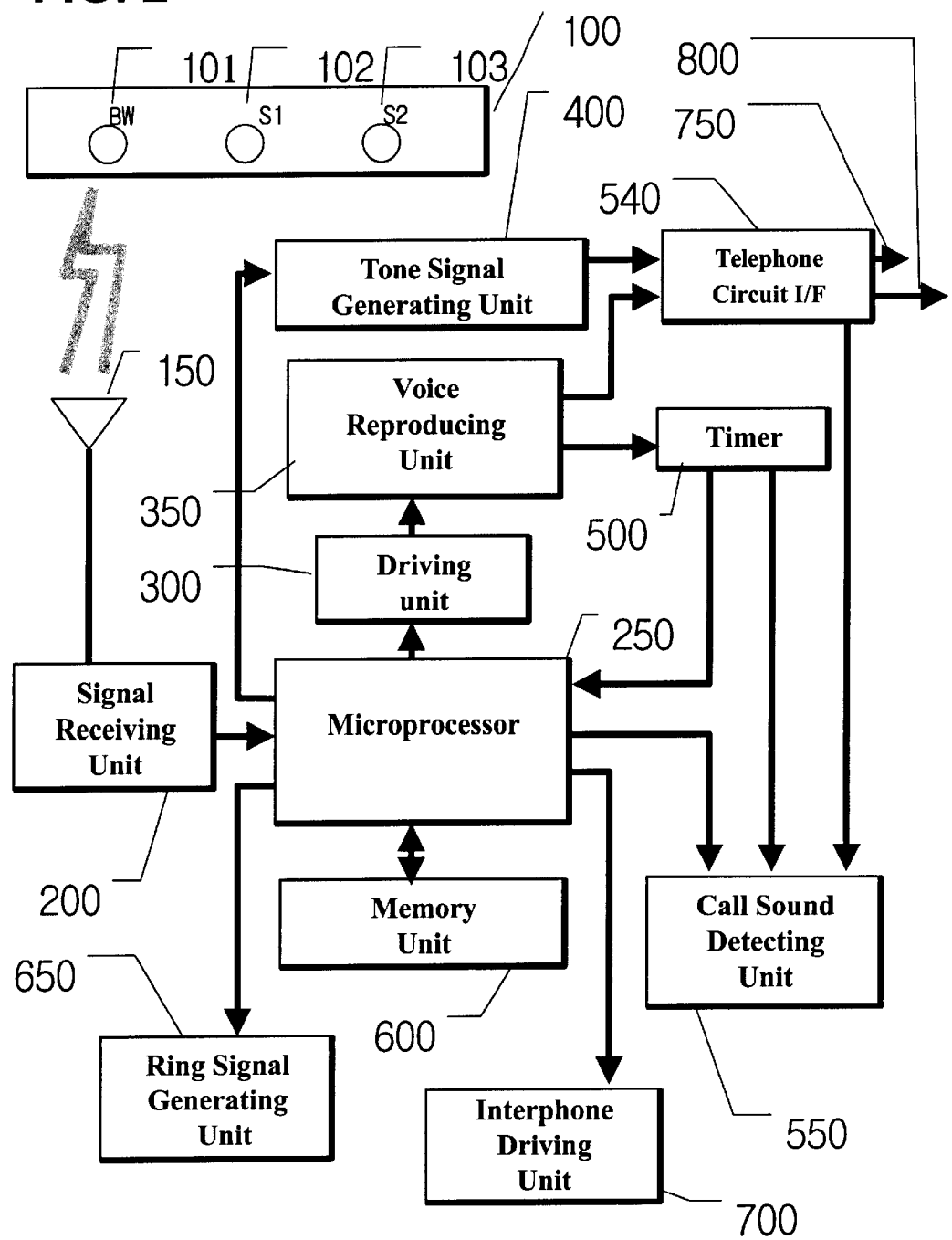
FIG. 2 is a block diagram showing the principal components of the automatic home alarm invention.

As shown in FIG. 2, the automatic home alarm system comprises: at least one detecting unit (100), typically including sensors (102, 103) operated through contact/no-contact switches, each of which sensors closes a circuit or otherwise generates a "state change signal" after an alarm trigger; a signal receiving unit (200) for receiving via a wireline or wireless transmission path a state change signal from a sensor associated with the detecting unit (100); a first driver unit (300) under the control of a microprocessor (250) and that generates a drive signal to a voice reproducing unit (350); a voice reproducing unit (350) that is driven by the first driver unit (300) and outputs a pre-recorded voice message, which is selected and retrieved from an announcement database and provided to the telephone circuit interface unit (540); a tone signal generating unit (400) controlled by the microprocessor that dials a telephone call or otherwise establishing connectivity through telephone lines (750, 800) to send notification, e.g., a voice message, of an intrusion or other alarm trigger; a telephone circuit interface unit or equivalent device (540) in the path between the tone signal generating unit (400) and the voice reproducing unit (350) on the one hand, and one or more telephone circuits (750, 800) on the other hand; a timer (500); a call sound detecting unit (550) that monitors the telephone lines to detect an off-hook condition of a called party's telephone; a memory unit (600) for storing telephone number data and providing such data to the microprocessor (250); a ring signal generating unit (650) that activates the ringer on a local telephone or other local sound alarm; an interphone driving unit (700) that converts a signal from the microprocessor (250) into a signal driving an interphone; and a control unit, typically a microprocessor (250), for selecting and reading the appropriate telephone number data from a memory unit (600) in response to signals from the signal receiving unit (200), which microprocessor (250) also controls the tone signal generating unit (400) to generate the tone signal according to the read telephone number data and transmit the same to a telephone circuit interface (540), and also controls the voice reproducing unit (350), the ring signal generating unit (650), and the interphone driving unit (700) in sequence according to the time counted by the timer (500) when an off-hook condition of the called party's telephone is detected by the call sound detecting means (550).

The detecting unit (100) includes one or more button switches (101), one or more temperature sensors (102), which can be installed in a portable article such as a bracelet that detects the temperature of the bracelet wearer, and one or more door sensors (103) installed in doors, such as those of cabinets in which valuables are stored. Herein, the sensors (101, 102, 103) are adapted in the detecting unit (100) to cause the generation of a second state change signal on a specific frequency that corresponds to the state change signal caused by an alarm trigger in a given sensor. Each second state change signal, and therefore each corresponding sensor, is assigned a given frequency in the link between the detecting unit (100) and the signal receiving unit (200). The assigned frequency identifies the sensor that has detected an alarm trigger.

The present invention can be operated using wire and/or radio paths between the detecting unit (100) and the signal receiving unit (200). When the path between the detecting unit (100) and the signal receiving unit (200) is a wire or other physical media, an appropriate wire transmission technology, e.g., frequency and voltage, is used. When the connection between the detecting unit (100) and the signal receiving unit (200) is wireless, the button switches (101), temperature sensors (102), and the door sensors (103) of the detecting unit (100) are respectively mounted with the same signal generating unit (not shown) for generating an ultrasonic, RF, or other wireless signal upon the occurrence of an alarm trigger for a given sensor. Whether wireline or wireless paths are used, an assigned frequency identifies the sensor that has experienced an alarm trigger.

The signal generating unit (not shown) receives the first state change signals from the various sensors (e.g., temperature, button contact closure, reed-switch opening) and generates the appropriate ultrasonic, RF, or other high-frequency second state change signal in the frequency band assigned to a given sensor. In an embodiment of the invention with an RF link, the high-frequency signal is received through an antenna (150) of the signal receiving unit (200) installed at a close range. Here, for RF signals, the antenna is preferably a small-sized antenna of high performance rather than a Yagi antenna, and receives the specific high-frequency signal transmitted from the detecting unit (100) regardless of the position or direction of the antenna.

The high-frequency signal received through the antenna (150) is signal converted, i.e., amplified and digitalized, and then applied to the microcomputer (250) for the overall control of the system.

The microprocessor (250) applies a read-enable signal to the memory unit (600) to read data indicating a specific telephone number, for example "112," which is previously stored in the memory unit (600), and then applies a control signal to the tone signal generating unit (400).

Upon receiving the control signal from the microprocessor (250), the tone signal generating unit (400) generates the tone signal corresponding to the specific telephone number to apply the same to the telephone circuit interface (540). The signal, which is applied to the telephone circuit interface (540) in this manner, is amplified and then transmitted to a destination of the specific telephone number through the telephone lines (750, 800).

Here, when the called party answers the phone called by the invention, the call sound detecting unit (550) connected to the telephone interface circuit (540) detects the off-hook condition of the called party's telephone and signals the microprocessor with a call sound detection signal. The microprocessor then applies a drive control signal to the driving unit (300).

Then, the driving unit (300), in response to control signals from the microprocessor (250) supplies the power necessary for driving the voice reproducing unit (350). The voice reproducing unit (350) reproduces the voice signal stored in a recording tape (not shown) or a memory (not shown) that comprise the announcements database, for example, a signal for indicating a message for informing the position and the emergency state of a caller. The voice reproducing unit (350) applies the reproduced voice signal to the telephone circuit interface (540). The telephone circuit interface (540) amplifies the voice signal and then transmits the amplified voice signal through the telephone lines (750, 800).

The timer (500) connected to the voice reproducing unit (350) counts the time for reproducing the voice signal from the voice reproducing unit (350), and the microprocessor (250) applies the control signal to the driving unit (300) to terminate the operation of the voice reproducing unit (350) when the counted time exceeds a predetermined reproduction time of the outgoing message, including any repetition of the outgoing message, as controlled by the microprocessor (250).

Meanwhile, the microprocessor (250) receives the call sound detection signal from the call sound detecting unit (550) to apply the drive control signal to the drive unit (300), and at the same time, apply the control signal to the ring signal generating unit (650) and the interphone driving unit (700). The ring signal generating unit (650) generates the ring signal that is used to cause a local telephone (not shown) to ring, or other sound alarm to be activated, as the same are installed in the house of the user of the invention ("caller").

When the caller dwells in an apartment for example, the interphone driving unit (700) can be connected to an interphone (not shown) of a guardroom, for example, to transmit a specific interphone call sound, and thus allows a listener to learn that the caller is in an emergency situation, and to take appropriate action.

The automatic home alarm system of the invention having the above configuration can be mounted inside the telephone as an internal type alarm system with all of the components except the detecting unit (100) being assembled on one board. Alternatively, the alarm system can be installed in the outside of the telephone as a separate device, i.e., an external alarm system.

Figure 3:
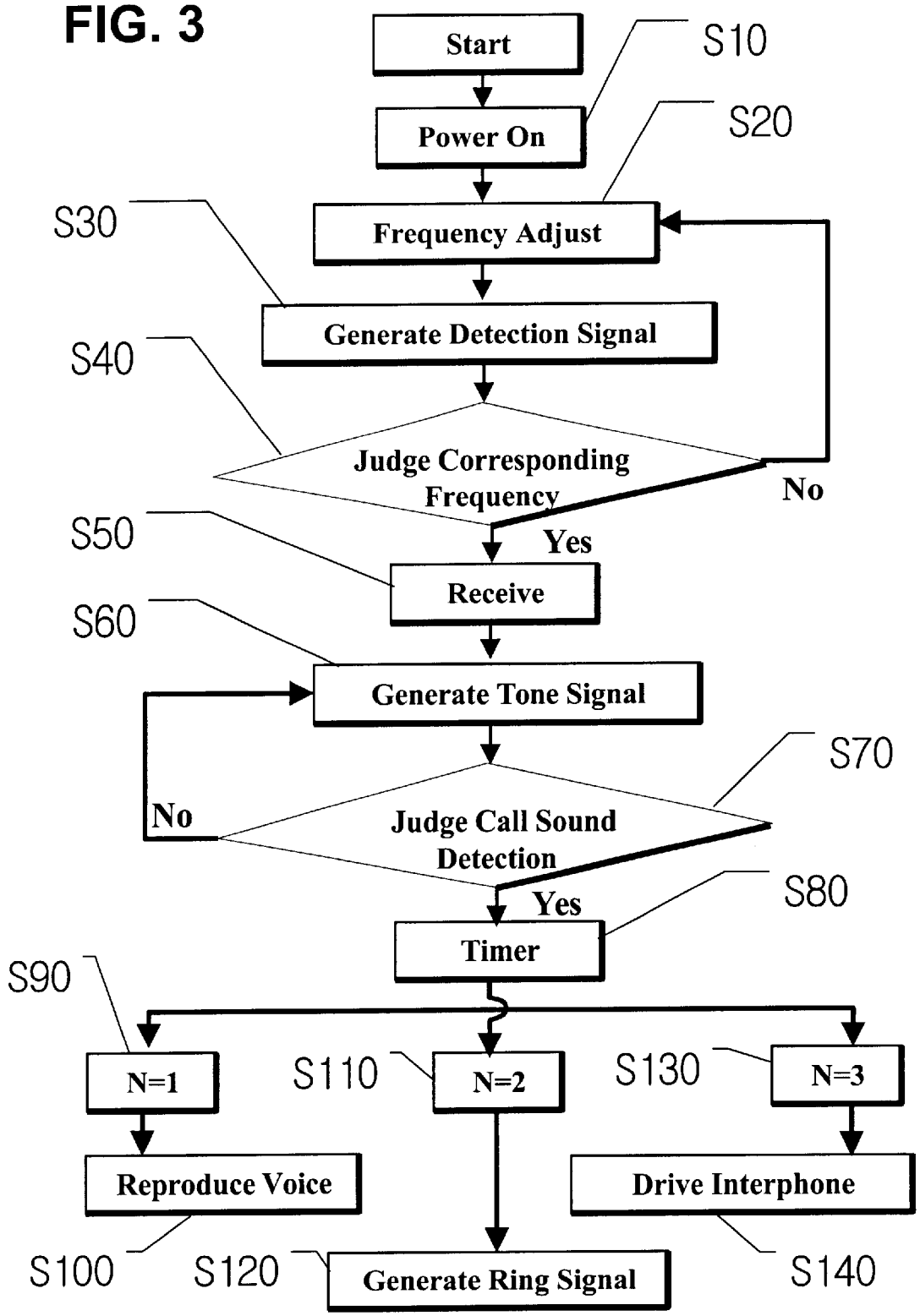
FIG. 3 is a block diagram showing the processing flow chart of the automatic home alarm invention.

As shown in FIG. 3, turning to the method of the invention, first, the automatic home alarm system is switched on in S10, the frequency is adjusted to match the frequencies in use by the detecting unit with that of the antenna and signal receiving unit in S20.

After the frequency is adjusted in the frequency adjusting step S20, upon the occurrence of an alarm trigger, the state change signal generated causes the generation of the assigned frequency from the detecting unit in S30.

The frequency generated in the detection signal generating step S30 is compared with a reference. If the frequency is determined to be abnormal, the system returns to the frequency adjusting step S20 to readjust the frequency. If the frequency is normal, a receiving step S50 is carried out to normally receive the signal.

Upon receiving the detection signal in the receiving step S50, the microprocessor reads the telephone data stored in the memory unit, and applies the telephone number data as the control signal to the tone signal generating unit. Accordingly, the tone signal generating unit generates the tone signal corresponding to the telephone number data in S60. The tone signal is transmitted to the telephone lines through the telephone circuit interface.

After carrying out the tone signal generating step S60, the microprocessor S250 determines if the call sound detecting unit 550 detects the off-hook condition of the called party's telephone in S70.

If an off-hook condition is determined in the call sound detection judging step S70, the counter 500 counts the time in S80.

In S90, if the time counted in the counting step S80 is '1', the microprocessor controls the driving unit, and accordingly the voice reproducing unit outputs the voice signal in S100. The voice signal is transmitted to the telephone lines through the telephone circuit interface.

After S100, if the time counted in the counting step S80 is judged as '2' in S10, the microprocessor controls the ring signal producing unit to generate the ring signal in S120. Then, a bell of the caller's telephone rings to perplex an intruder.

After the step S120, the time counted in the counting step S80 is judged as '3' in S130, the microprocessor controls the driving unit so that the specific interphone call sound is transmitted to the interphone (not shown) typically installed in the guardroom of the apartment building in S140. Thus, the emergency of the caller is announced to persons in the guardroom.

As described hereinbefore, the automatic home alarm system and method of the invention comprises the detection unit provided with the number of sensors, such as contact/non-contact switches. When the detecting unit is operated, the detection signal is transmitted by wireline or wireless signal in the specific frequency band and received through the antenna at a short range. Then, the received signal is applied to the microprocessor, which controls the tone signal generating unit and the voice reproducing unit to call the telephone at the specific site. This notifies called parties that the user is in an emergency to facilitate delivery of assistance to the caller.

Also, according to the invention, the microprocessor applies the control signal to the ring signal generating unit and the interphone driving unit to ring the caller's telephone or other local sound alarms, and causes a specific sound or message to be emitted by the connected interphone. The ringing of the caller's telephone perplexes the intruder, and the message emitted by the connected interphone alerts personnel in the guardroom.

I claim:

1. An automatic home alarm system comprising:

a detecting means that detects a first state change signal from at least one sensor connected to it upon the occurrence of an alarm trigger, and then generates a corresponding second state change signal and transmits the second state change signal by wireline or wireless transmission to a receiving means;

a receiving means for receiving the second state change signal from said detecting means;

a first driving means for generating a drive signal;

a voice reproducing means being driven by said driving means for outputting a prerecorded voice signal through telephone lines to notify called parties of the alarm triggers;

a means for generating a tone signal;

one or more wireline or wireless telecom paths;

a timer means;

a telephone circuit interface means;

a means for detecting an off-hook condition of a party called through the telephone circuit interface means and the telecom paths;

a memory means for storing telephone number data;

a means for generating a ring signal;

a second driving means for driving an interphone; and a control means for reading the telephone number data from said memory means in response to the signal from said signal receiving means, for controlling the tone signal generating means to generate the tone signal according to the read telephone number data and transmit the same to a telephone circuit interface, and for controlling said voice reproducing means, the ring signal generating means and the interphone driving means in sequence according to the time counted by said timer means when the off-hook condition is detected by said call sound detecting means.

2. The automatic home alarm system according to claim 1, wherein said detecting means includes a plurality of switches, assigns a frequency band to a given sensor, and generates the second state change signal in the frequency band that corresponds to a sensor that has generated a first state change signal.

3. An automatic home alarm method that can receive a state change signal from a sensor in a detection means and notify one or more called parties of the alarm trigger that caused the generation of the state change signal, said method comprising the following steps of:

generating a state change signal upon occurrence of an alarm trigger in a given sensor;

generating a tone signal corresponding to a stored telephone number upon receiving the state change signal;

determining if a call signal is detected after said step of generating the tone signal;

if the call signal is judged as detected in the preceding step, counting the time using a timer means; and sequentially driving voice reproduction, ring signal generation, and interphone announcements or alarms according to the time counted in the preceding step.

* * * * *